(12) United States Patent
Chong et al.

(10) Patent No.: US 11,770,470 B2
(45) Date of Patent: Sep. 26, 2023

(54) PORTABLE TERMINAL ACCESSORY MODULE HAVING DETACHABLE MEANS

(71) Applicant: SINJIMORU Co., Ltd, Seoul (KR)

(72) Inventors: Chan Ho Chong, Seoul (KR); Han Dae Lim, Seoul (KR); Seung In Ham, Seoul (KR)

(73) Assignee: SINJIMORU Co., Ltd, Seoul (KR)

( * ) Notice: Subject to any disclaimer, the term of this patent is extended or adjusted under 35 U.S.C. 154(b) by 0 days.

(21) Appl. No.: 17/801,877

(22) PCT Filed: Feb. 19, 2021

(86) PCT No.: PCT/KR2021/002098
§ 371 (c)(1),
(2) Date: Aug. 24, 2022

(87) PCT Pub. No.: WO2021/172814
PCT Pub. Date: Sep. 2, 2021

(65) Prior Publication Data
US 2023/0080883 A1 Mar. 16, 2023

(30) Foreign Application Priority Data
Feb. 24, 2020 (KR) .................. 10-2020-0022300

(51) Int. Cl.
*H04B 1/38* (2015.01)
*H04M 1/21* (2006.01)
*H02J 50/00* (2016.01)

(52) U.S. Cl.
CPC ............. *H04M 1/21* (2013.01); *H02J 50/00* (2016.02)

(58) Field of Classification Search
CPC .. H04M 1/21; H04M 1/0252; H04M 1/72409; H04M 1/724092; H02J 50/00
See application file for complete search history.

(56) References Cited

U.S. PATENT DOCUMENTS

| 8,830,663 B2 * | 9/2014 | Child ................. H04M 1/21 361/679.01 |
| 11,527,913 B2 * | 12/2022 | Min ................. H02J 7/0044 |
| 2014/0376763 A1 * | 12/2014 | Stevinson ......... A45C 11/00 381/370 |

FOREIGN PATENT DOCUMENTS

| KR | 20-0464902 Y1 | 1/2013 |
| KR | 10-2014-0123649 A | 10/2014 |

(Continued)

OTHER PUBLICATIONS

International Search Report issued for PCT/KR2021/002098 dated Jun. 10, 2021.

(Continued)

*Primary Examiner* — Tuan Pham
(74) *Attorney, Agent, or Firm* — Sughrue Mion, PLLC

(57) ABSTRACT

Provided is a portable terminal accessory module having a detachable means, the portable terminal accessory module including a fixing unit including a fixing plate having a plate shape and one surface coupled to any one of a portable terminal or an accessory unit, a plate-shaped protrusion protruding from an outer circumferential surface of the fixing plate, and an attachment means for forming an attachment force of the fixing plate, a mounting unit detachably coupled to the fixing plate and including a mounting plate having a plate shape and one surface on which the fixing unit is seated, and a coupling slot formed to protrude from the mounting plate and configured such that the plate-shaped protrusion is detachably fitted with the coupling slot by rotation, and an accessory unit coupled to the mounting plate.

10 Claims, 7 Drawing Sheets

(56) References Cited

FOREIGN PATENT DOCUMENTS

| KR | 10-2016-0054904 A | 5/2016 |
|---|---|---|
| KR | 10-2017-0131188 A | 11/2017 |
| KR | 10-2196015 B1 | 12/2020 |

OTHER PUBLICATIONS

Written Opinion issued for PCT/KR2021/002098 dated Jun. 10, 2021.

* cited by examiner

# PORTABLE TERMINAL ACCESSORY MODULE HAVING DETACHABLE MEANS

CROSS REFERENCE TO RELATED APPLICATIONS

This application is a National Stage of International Application No. PCT/KR2021/002098 filed Feb. 19, 2021, claiming priority based on Korean Patent Application No. 10-2020-0022300 filed Feb. 24, 2020.

TECHNICAL FIELD

The present invention relates to a portable terminal accessory module having a detachable means, and more particularly, to a portable terminal accessory module having a detachable means stably detachably coupled to a rear surface of a portable terminal or a rear surface of a portable terminal protecting casing and configured to allow various portable terminal accessories to be used while being variably attached or detached.

BACKGROUND ART

In general, portable terminals such as smartphones are variously used, in real life, to use wireless Internet, take photographs, watch movies, use navigation, and play games in addition to voice communication functions. Various accessories related to the portable terminals are also available and used together with the portable terminals.

As an example of the technology related to portable terminal accessories, Korean Patent No. 10-1777505 discloses a portable terminal accessory including a connection member having a spring groove that accommodates a spring and a ball, a flat spring fitted with the connection member, integrally having a plate shape, and having an elastic protruding portion for providing elasticity, a ring having a rotary shaft portion and fitted with an interior of the flat spring, an attachment plate having a plate shape, configured to be in close contact with the connection member, and having a plurality of catching holes, and a cover assembled after being fitted with an exterior of the attachment plate, in which the connection member, the ring, and the cover are integrally rotated relative to the attachment plate.

However, the portable terminal accessory in the related art is configured only to easily implement particular limited purposes (to be easily gripped or mounted) and fixed to the portable terminal. For this reason, there is a problem in that it is difficult to change the use of the portable terminal accessory from the portable terminal accessory to be gripped to the portable terminal accessory to be mounted. Further, a separate accessory needs to be additionally installed to change the use.

DISCLOSURE

Technical Problem

An object of the present invention is to provide a portable terminal accessory module having a detachable means, in which a modularized accessory is configured to correspond to various uses of a portable terminal, and the modularized accessory is attachable to or detachable from the portable terminal such that the alteration of use may be easily implemented and the convenience may be improved, and the alteration of use may be implemented without adding a separate accessory component such that the detachable means is economical.

Technical Solution

The present invention provides a portable terminal accessory module having a detachable means, which makes it easy to attach or detach various accessory units to or from a rear surface of a portable terminal and stably maintains attachment/detachment coupling forces, the portable terminal accessory module including: a fixing unit including a fixing plate having a plate shape and one surface coupled to any one of the portable terminal and the accessory unit, a plate-shaped protrusion protruding from an outer circumferential surface of the fixing plate, and an attachment means configured to generate an attachment force of the fixing plate; a mounting unit detachably coupled to the fixing plate and including a mounting plate having a plate shape and one surface on which the fixing unit is seated, and a coupling slot protruding from the mounting plate and configured such that the plate-shaped protrusion is detachably fitted with the coupling slot by rotation; and an accessory unit coupled to the mounting plate.

In this case, the fixing plate may have a circular plate shape, the plate-shaped protrusion may protrude in a radial direction from the outer circumferential surface of the fixing plate, the mounting plate may have a circular plate shape so that the fixing plate and the plate-shaped protrusion are seated on the mounting plate, and the coupling slot may protrude toward a center from an outer circumferential surface of the mounting plate so that the plate-shaped protrusion is fitted with the coupling slot during a fastening process.

The plate-shaped protrusion may be provided in plural, the plurality of plate-shaped protrusions may be spaced apart from one another at spacing angles set from a center of the fixing plate, and the coupling slots may be spaced apart from one another and correspond in number and position to the plate-shaped protrusions.

In this case, the coupling slot may have an arc-shaped cut-out portion cut out from an annular slot portion protruding toward a center from the outer circumferential surface of the mounting plate so that the plate-shaped protrusion is seated.

In this case, the cut-out portion and the plate-shaped protrusion may have the same planar cross-sectional shape and size.

The plate-shaped protrusion may have a catching projection protruding from an end of a side of the mounting unit based on a fastening direction, and when the mounting unit rotates, a lateral surface of the coupling slot may be caught by the catching projection, such that the catching projection prevents the mounting plate from excessively rotating or restricts the fastening direction of the mounting unit.

The coupling slot may have a fastening groove or a fastening hole, and the plate-shaped protrusion may have a fastening protrusion that protrudes and be detachably fitted with the fastening groove or the fastening hole when the coupling slot is fastened.

The fixing unit may have a thickness in a range in which wireless charging is enabled.

The attachment means may be configured as an attachment member having one surface and the other surface onto which an adhesive agent is applied, one surface of the attachment member may be attached to the fixing plate, and the other surface of the attachment member may be attached to the portable terminal.

The mounting unit may further include a connection portion that allows the accessory unit to be coupled to the mounting plate, and the accessory unit may be configured as an accommodation means that has one surface coupled to the connection portion, has opened one side, and has therein an accommodation space that accommodates an accommodation object.

The connection portion may have a plate shape and define or support one surface of the accommodation space of the accommodation means, and the accommodation means may be any one of a pouch, a casing, and a wallet coupled to the connection portion and configured to accommodate the accommodation object in an internal space or a coupling space defined by the connection portion.

Meanwhile, the mounting plate may have an anti-separation protrusion positioned adjacent to a lateral surface of the coupling slot based on a separation direction. During a fastening and rotation process, the anti-separation protrusion may be spaced apart from the lateral surface of the coupling slot, which adjoins the plate-shaped protrusion, by a predetermined spacing arc length. The anti-separation protrusion may have a spacing arc length shorter than the arc length of the plate-shaped protrusion and protrude so that the lateral surface of the plate-shaped protrusion is caught by the anti-separation protrusion during the rotation in the separation direction to prevent the separation.

In this case, the anti-separation protrusion may be formed such that the lateral surface of the anti-separation protrusion, which adjoins the plate-shaped protrusion, has a downward inclined surface during the detachment rotation.

The fixing plate may have a snap button protrusion formed at a rotation center portion. The mounting plate may have a snap button groove rotatably attached and coupled to the rotation center portion by being press-fitted with the snap button protrusion.

The detachable means may be provided such that a first tapered portion may be formed on one side surface of the plate-shaped protrusion that comes into contact with the coupling slot. A second tapered portion may be formed on a lateral surface of the coupling slot inner surface, which faces the first tapered portion, so that a press-fitting force is generated when the plate-shaped protrusion is fastened.

In this case, the first tapered portion may have a predetermined first arc length from a fastening inlet side end in the overall arc length of one side surface. The second tapered portion may have a predetermined second arc length that is equal to the first arc length and defined from the fastening inlet side in the overall arc length of the lateral surface of the coupling slot or the mounting plate to which the plate-shaped protrusion is fastened.

Further, the detachable means may be provided such that the first tapered portion may be formed at a first taper angle with respect to a horizontal central axis of the plate-shaped protrusion, the second tapered portion may be formed at a second taper angle with respect to a horizontal central axis of an insertion space into which the plate-shaped protrusion is inserted, and the second taper angle may be larger than the first taper angle.

In addition, the connection portion may have a circular plate shape coupled to the mounting plate. The accessory unit may include a grip portion rotatably coupled to the connection portion, having a ring or annular shape, and configured to be gripped by the user.

Advantageous Effects

The portable terminal accessory module having the detachable means according to the present invention includes the modularized accessory unit corresponding to various uses of the portable terminal, and the modularized accessory unit is attachable to or detachable from the portable terminal by means of the fixing unit and the mounting unit, such that the alteration of use may be easily performed, thereby improving the convenience. Further, it is not necessary to add a separate accessory component for the alteration of use, which makes it possible to reduce costs and provide an economical effect.

In addition, the portable terminal accessory module having the detachable means according to the present invention has the structure that is attached or detached by being simply rotated by the user. Therefore, the portable terminal accessory module is easy to use. Further, the portable terminal accessory module is easily manufactured and economical because the portable terminal accessory module has a simple structure.

In addition, the portable terminal accessory module having the detachable means according to the present invention may be used in a wide range because the portable terminal accessory module may implement various accessories.

In addition, the fixing unit of the portable terminal accessory module having the detachable means according to the present invention has a thickness set within a range in which wireless charging is enabled. Therefore, it is possible to easily perform wireless charging only by simply detaching the mounting unit without separating the entire accessory parts to perform the wireless charging.

BEST MODE

Figure 1:
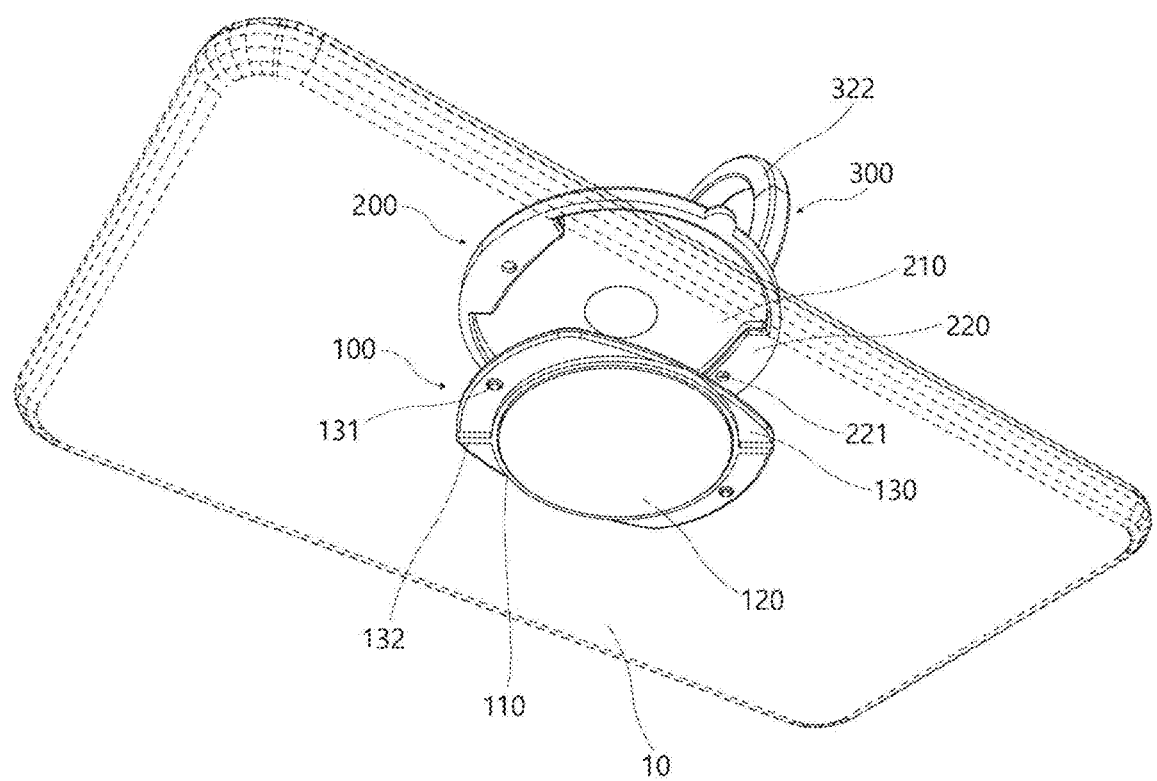
FIG. 1 is an exploded perspective view illustrating a portable terminal accessory module having a detachable means according to an embodiment of the present invention.

An exemplary embodiment of the present invention provides a portable terminal accessory module having a detachable means, which makes it easy to attach or detach various accessory units to or from a rear surface of a portable terminal and stably maintains attachment/detachment coupling forces, the portable terminal accessory module including: a fixing unit including a fixing plate having a plate shape and one surface coupled to any one of the portable terminal and the accessory unit, a plate-shaped protrusion protruding from an outer circumferential surface of the fixing plate, and an attachment means configured to generate an attachment force of the fixing plate; a mounting unit detachably coupled to the fixing plate and including a mounting plate having a plate shape and one surface on which the fixing unit is seated, and a coupling slot protruding from the mounting plate and configured such that the plate-shaped protrusion is detachably fitted with the coupling slot by rotation; and an accessory unit coupled to the mounting plate. The fixing plate has a circular plate shape, the plate-shaped protrusion protrudes in a radial direction from the outer circumferential surface of the fixing plate, the mounting plate has a circular plate shape so that the fixing plate and the plate-shaped protrusion are seated on the mounting plate, and the coupling slot protrudes toward a center from an outer circumferential surface of the mounting plate so that the plate-shaped protrusion is fitted with the coupling slot during a fastening process.

According to the present invention, the modularized accessory unit corresponding to various uses of the portable terminal is provided, and the modularized accessory unit is attachable to or detachable from the portable terminal by means of the fixing unit and the mounting unit, such that the alteration of use may be easily performed, thereby improving the convenience. Further, it is not necessary to add a separate accessory component for the alteration of use, which makes it possible to reduce costs and provide an economical effect.

MODES OF THE INVENTION

Hereinafter, a method of manufacturing a noodle soup with beef according to a specific embodiment of the present invention will be described with reference to the accompanying drawings.

Prior to the description, the effects and features of the present invention and the method of achieving the effects and features will be clear with reference to embodiments described in detail below together with the accompanying drawings. However, the present invention is not limited to the embodiments disclosed herein but will be implemented in various forms. The embodiments of the present invention are provided so that the present invention is completely disclosed, and a person with ordinary skill in the art can fully understand the scope of the present invention. The present invention will be defined only by the scope of the appended claims.

In the description of the embodiments of the present invention, the specific descriptions of publicly known functions or configurations will be omitted when it is determined that the specific descriptions may unnecessarily obscure the subject matter of the present invention. The terms used in the embodiments of the present invention are defined considering the functions in the present invention and may vary depending on the intention or usual practice of a user or an operator. Therefore, the definition of the present invention should be made based on the entire contents of the present specification.

First, referring to FIGS. 1 and 2, a portable terminal accessory module having a detachable means (hereinafter, referred to as an 'accessory module') according to an embodiment of the present invention is configured to make it easy to attach or detach various accessory units to or from a rear surface of a portable terminal and stably maintain attachment and detachment coupling forces and includes a fixing unit 100, a mounting unit 200, and an accessory unit 300.

The fixing unit 100 may be fixedly coupled to any one of the portable terminal 10 and the accessory unit 300. The drawing illustrates that the fixing unit 100 is coupled to a rear surface of the portable terminal 10. However, the fixing unit 100 may of course be designed to be coupled to the accessory unit 300.

The fixing unit 100 may include a fixing plate 110, an attachment means 120, and plate-shaped protrusions 130.

The fixing plate 110 has a plate shape and one surface coupled to the rear surface of the portable terminal 10. As illustrated, the fixing plate 110 may have a circular plate shape.

The attachment means 120 serves to form an attachment force of the fixing plate 110 and attach the fixing plate 110 to the portable terminal 10. In this case, the attachment means 120 may be configured as an attachment member having one surface and the other surface onto which an adhesive agent is applied, one surface of the attachment means 120 is attached to the fixing plate 110, and the other surface of the attachment means 120 is attached to the portable terminal 10. In this case, a double-sided tape or the like may be applied as the attachment member.

The plate-shaped protrusions 130 protrude from an outer circumferential surface of the fixing plate 110 and are fastened to coupling slots 220, which will be described below, when the mounting unit 200 is fastened. The plate-shaped protrusion 130 may protrude in a radial direction from the outer circumferential surface of the fixing plate 110 having a circular plate shape.

The plate-shaped protrusion 130 may have a catching projection 132 protruding from an end of a side of the mounting unit 200 based on a fastening direction. When the mounting unit 200 rotates, a lateral surface of the coupling slot 220 is caught by the catching projection 132. Therefore, the catching projection 132 serves to prevent the mounting plate 210 from excessively rotating or restrict the fastening direction of the mounting unit 200.

A fastening protrusion 131 may protrude from a lateral surface of the plate-shaped protrusion 130 that comes into contact with the coupling slot 220. The fastening protrusion 131 is detachably fitted with a fastening hole 221 or a fastening groove of the coupling slot 220 to be described below and serves to ensure a fastening force to the coupling slot 220 and prevent the separation of the mounting unit 200 caused by slipping of the mounting unit 200. In this case, a protruding height of the fastening protrusion 131 may be set so that the fastening protrusion 131 is separated by an external force applied by a user but is not separated by slipping. As illustrated, one fastening protrusion 131 may be formed at a central portion of the plate-shaped protrusion 130, but the present invention is not limited thereto.

The mounting unit 200 is detachably coupled to the fixing plate 110 by the user's manipulation. The mounting unit 200 may include a mounting plate 210 and the coupling slots 220.

The mounting plate 210 has a plate shape and one surface on which the fixing unit 100 is seated. The mounting plate 210 may have a circular plate shape so that the fixing plate 110 and the plate-shaped protrusions 130 are seated on the mounting plate 210. In this case, as illustrated, the mounting plate 210 may have a seating groove portion formed in a groove shape in one surface thereof so that the fixing plate 110 and the plate-shaped protrusions 130 may be seated.

The coupling slot 220 protrudes from the mounting plate 210 and is detachably fitted with the plate-shaped protrusion 130 by the rotation of the mounting plate 210. In the drawings, the coupling slot 220 may protrude toward a center from an outer circumferential surface of the mounting plate 210 so that the plate-shaped protrusion 130 is fitted with the coupling slot 220 during a fastening process.

As illustrated, the coupling slot 220 may have a fastening hole 221 to which the fastening protrusion 131 is detachably coupled. However, this configuration is one embodiment, and the coupling slot 220 may have a fastening groove instead of the fastening hole 221.

Figure 7:
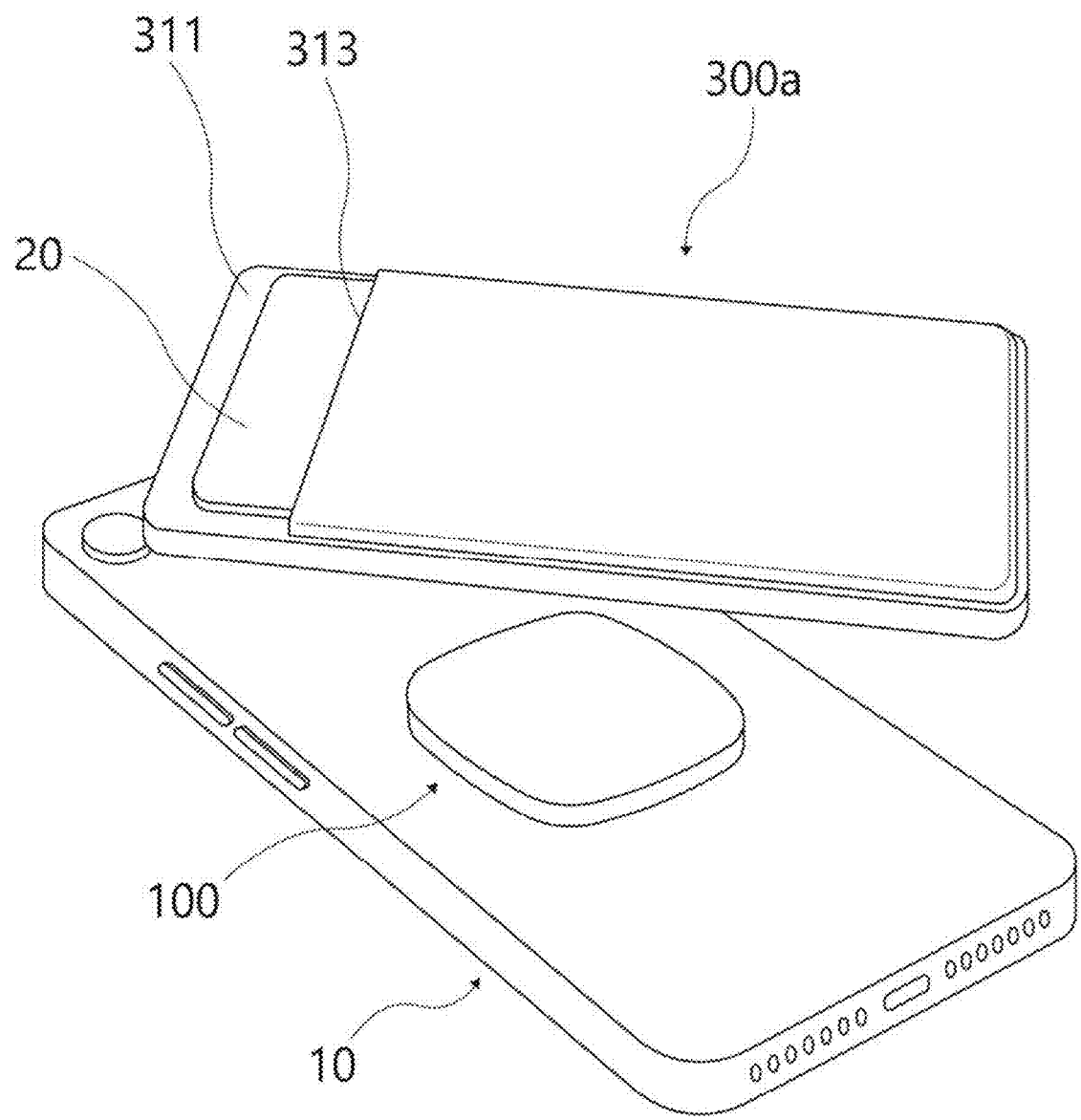
FIG. 7 is a perspective view illustrating an embodiment of an accessory unit including an accommodation means in the portable terminal accessory module having the detachable means in FIG. 1.

Meanwhile, the plate-shaped protrusions 130 and the coupling slots 220 may correspond in position and number to one another. That is, the plate-shaped protrusion 130 may be provided in plural, and the plurality of plate-shaped protrusions 130 may be spaced apart from one another at spacing angles set from a center of the fixing plate 110. Therefore, the coupling slots 220 may be spaced apart from one another and correspond in number and position to the plate-shaped protrusions 130. In the drawings, the plate-shaped protrusions 130 are provided as a pair of plate-shaped protrusions 130, the coupling slots 220 are provided as a pair of coupling slots 220, and the pair of plate-shaped protrusions 130 and the pair of coupling slots 220 are positioned symmetrically while having a spacing angle of 180°. However, this configuration is one embodiment, the fixing unit 100 may have various numbers of plate-shaped protrusions 130 may be provided symmetrically with respect to a rotation center. Therefore, as illustrated in FIGS. 1 to 4, a rotation angle for coupling of the plate-shaped protrusions 130 is about 90° when the two plate-shaped protrusions 130 are formed to be opposite to two opposite sides of the fixing plate 110. In contrast, as illustrated in FIG. 7, a rotation angle may be about 45° in a case in which four plate-shaped protrusions 130 are formed.

Further, the fixing unit has a height (thickness) set within a range in which wireless charging is possible, such that the wireless charging may be performed without change in a state in which the mounting unit is separated. In this case, assuming that the height, which enables the wireless charging, is about 5 mm, the thickness of the fixing unit may be set within a range of 2 mm to 3 mm Therefore, various heights may be set as long as the above-mentioned object may be achieved.

Figure 3:
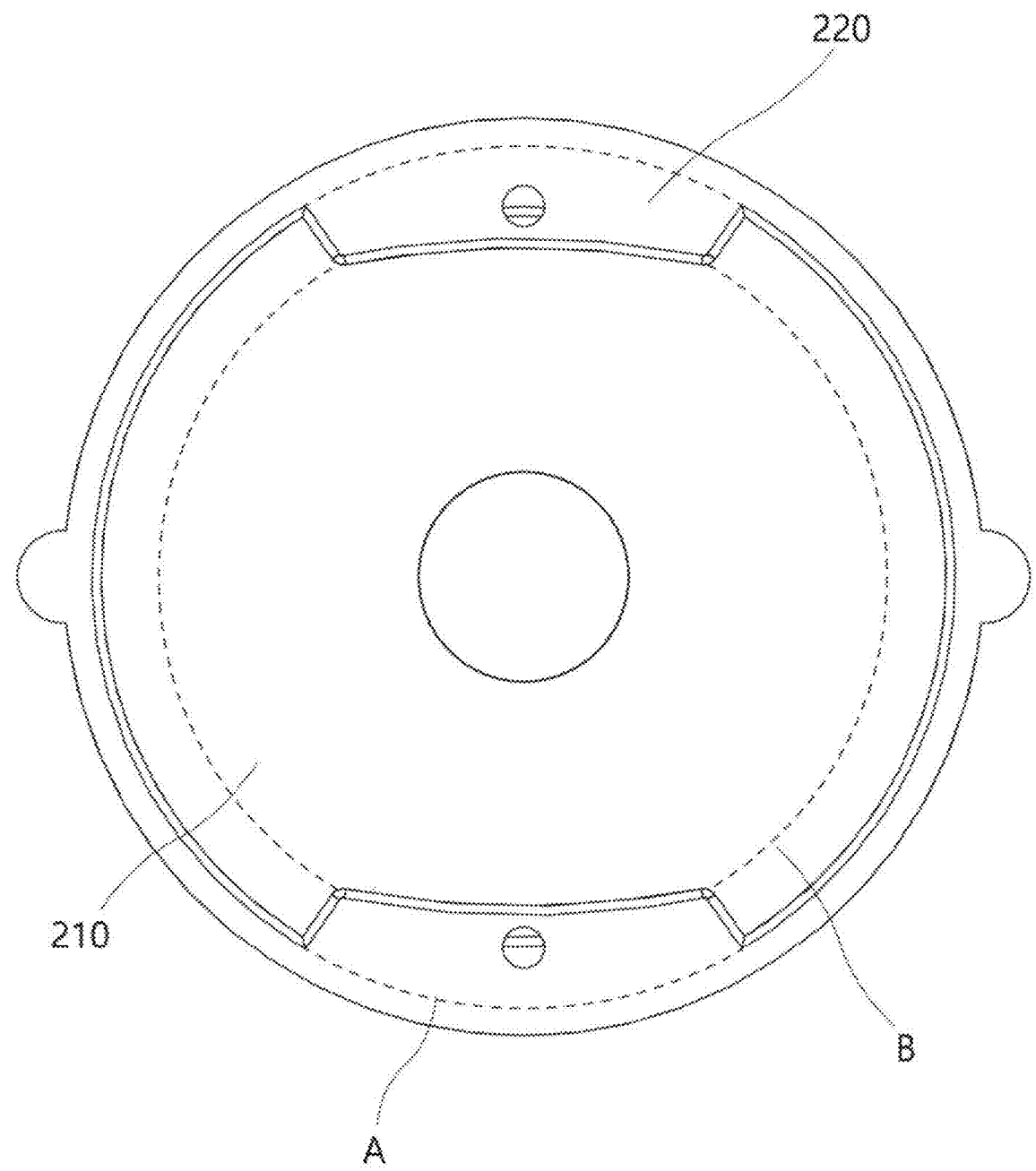
FIG. 3 is a bottom plan view illustrating the fixing unit and illustrating a plate-shaped protrusion and a cut-out portion in FIG. 1.

Referring to FIG. 3, the coupling slot 220 may protrude toward the center from the outer circumferential surface of the mounting plate 210 so that the plate-shaped protrusion 130 is fitted with the coupling slot 220 during the fastening process. Specifically, the coupling slot 220 may have an arc-shaped cut-out portion B cut out from an annular slot portion A protruding toward the center from the outer circumferential surface of the mounting plate 210. In this case, the cut-out portion may have a shape and size that allow the plate-shaped protrusion 130 to be seated on the cut-out portion. The cut-out portion may have the same planar cross-sectional shape and size as the plate-shaped protrusion 130 to prevent the separation of the mounting unit 200.

Figure 4:
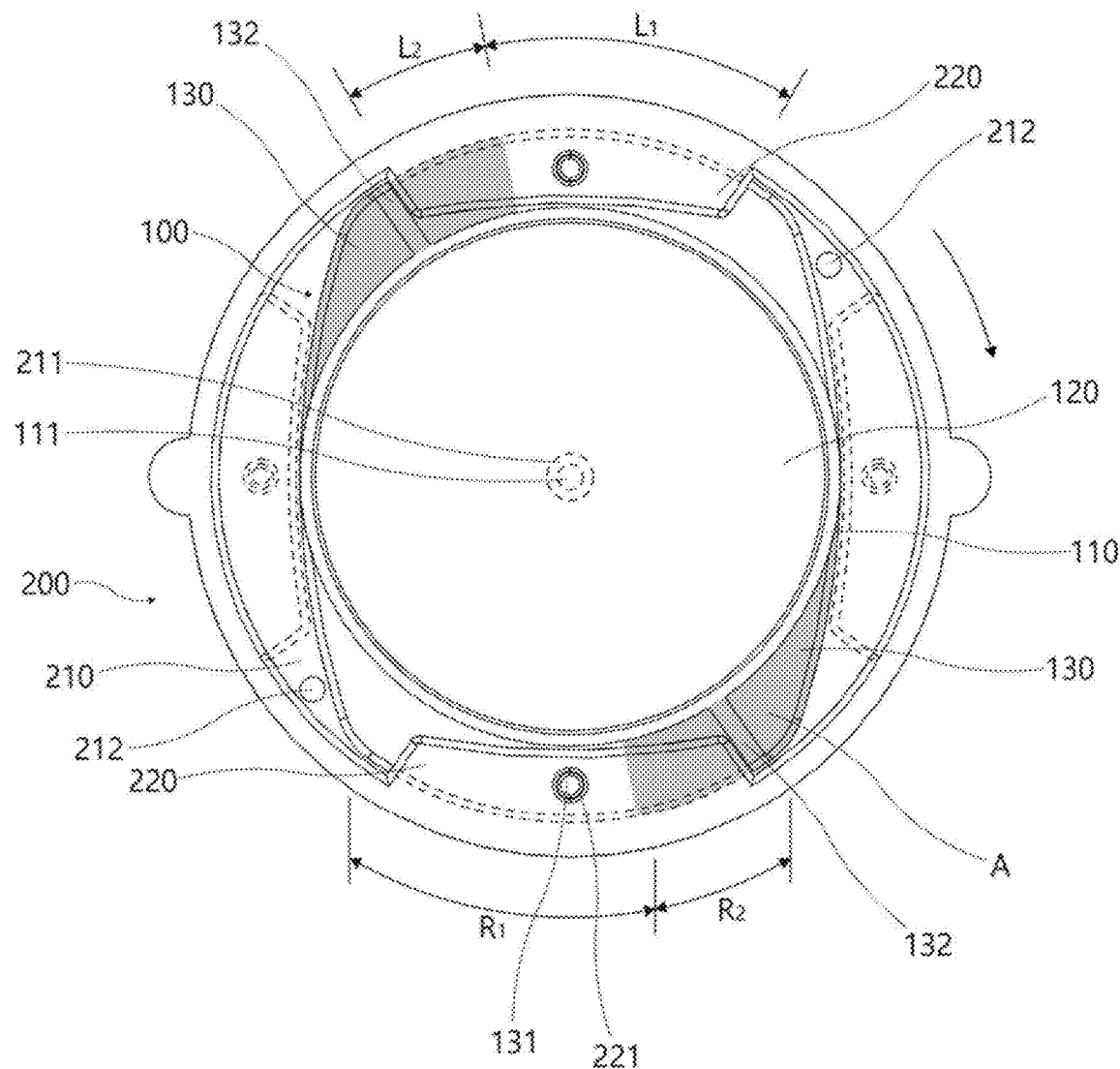
FIG. 4 is a bottom plan view illustrating another embodiment of the fixing unit and the mounting unit made by providing tapered portions to the fixing unit and the mounting unit of the portable terminal accessory module having the detachable means in FIG. 1.

FIG. 4 is a view illustrating another embodiment of the fixing unit 100 and the mounting unit 200.

Referring to the drawings, the fixing unit 100 and the mounting unit 200 may be configured to improve a fastening force by generating a press-fitting force during the fastening process.

Figure 5:
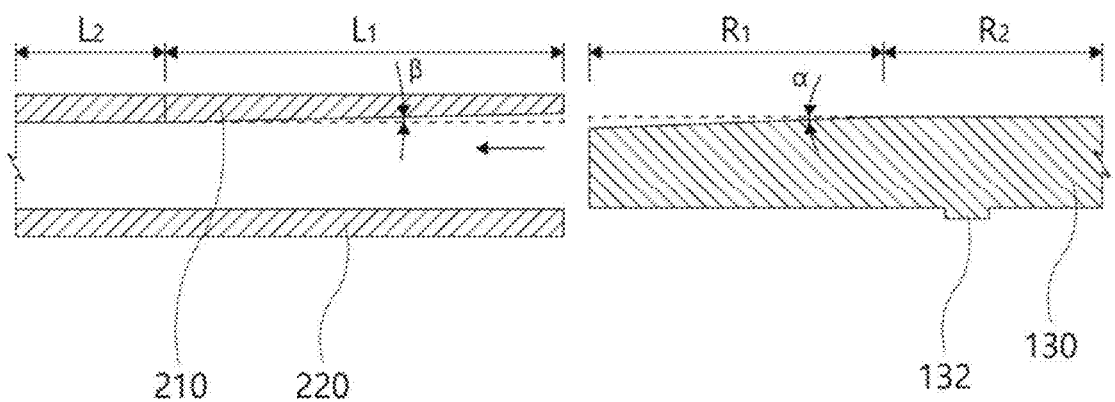
FIG. 5 is a conceptual view illustrating a process of fastening the fixing unit and the mounting unit by means of the tapered portions in FIG. 4.

First, referring to FIG. 5, a first tapered portion 133 may be formed on one side surface of the plate-shaped protrusion 130 that comes into contact with the mounting unit 200. The drawing illustrates that the first tapered portion 133 is formed on an upper surface of the plate-shaped protrusion that comes into contact with the mounting plate 210. However, the first tapered portion 133 may of course be formed on a lower surface of the plate-shaped protrusion that comes into contact with the coupling slot 220.

Further, a second tapered portion 230 may be formed on an inner surface of the mounting unit 200, which faces the first tapered portion 133, so that a press-fitting force is generated when the plate-shaped protrusion 130 is fastened. The drawing illustrates that the second tapered portion 230 is formed on the mounting plate 210 that comes into contact with the upper surface of the plate-shaped protrusion 130. However, the second tapered portion 230 may of course be formed in the coupling slot 220 that comes into contact with the lower surface of the plate-shaped protrusion 130.

Meanwhile, the first tapered portion 133 and the second tapered portion 230 may be formed in the entire section or the partial section of a contact area between the plate-shaped protrusion 130 and the coupling slot 220, thereby setting a section in which the press-fitting force is applied.

For example, the first tapered portion 133 and the second tapered portion 230 may be formed in the partial section of the contact area between the plate-shaped protrusion 130 and the coupling slot 220 and configured to apply the press-fitting force only to a predetermined section after the mounting unit 200 is fastened.

As an embodiment related to this configuration, the accessory module may be configured to generate the press-fitting force only when the accessory module moves in a preset inner insertion region C without generating the press-fitting force for a predetermined length at an insertion port side in the overall length of the coupling slot 220.

To this end, the first tapered portion 133 may have a predetermined first arc length R2 from a fastening inlet side end of an overall arc length of one side surface of the plate-shaped protrusion 130 that comes into contact with the mounting unit. Further, the second tapered portion 230 may have a predetermined second arc length L2, equal to the first arc length, from the fastening inlet side of the overall arc length of the lateral surface of the coupling slot 220 to which the plate-shaped protrusion 130 is fastened.

Meanwhile, the first tapered portion 133 and the second tapered portion 230 may not generate a press-fitting force during an initial fastening process but may generate a press-fitting force when the fastening process is performed to some extent. This is to allow the user to easily fasten the mounting unit 200 by preventing the generation of the press-fitting force when the user initially rotates and fastens the mounting unit 200 and to ensure a fastening force by generating the press-fitting force when the fastening process is performed to some extent.

Therefore, the first tapered portion 133 has the first arc length R2 from the fastened inlet side end to the outlet side end from a point at which the predetermined arc length R1 is ended in the overall arc length of the plate-shaped protrusion 130. The second tapered portion 230 has the second arc length L2 from the fastened inlet side end to the outlet side end from a point at which the predetermined arc length L1 is ended in the overall arc length of the coupling slot 220.

Further, the first tapered portion 133 may be formed at a first taper angle with respect to a horizontal central axis of the plate-shaped protrusion 130, the second tapered portion 230 may be formed at a second taper angle with respect to a horizontal central axis of an insertion space into which the plate-shaped protrusion 130 is inserted, and the second taper angle may be larger than the first taper angle.

Therefore, during the process of fastening the mounting unit 200, the accessory module may not generate the press-fitting force because the coupling slot 220 and the plate-shaped protrusion 130 do not come into contact with each other because of the taper in the R1 and L1 sections. The accessory module may generate the press-fitting force as the coupling slot 220 and the plate-shaped protrusion 130 come into contact with each other in the R2 and L2 section.

Meanwhile, the mounting plate 210 may have anti-separation protrusions 212. As illustrated, the anti-separation protrusion 212 is positioned adjacent to a lateral surface of the coupling slot 220 based on a separation direction. During the fastening and rotation process, the anti-separation protrusion 212 is spaced apart from the lateral surface of the coupling slot 220, which adjoins the plate-shaped protrusion 130, by a predetermined spacing arc length. In this case, the anti-separation protrusion 212 has a spacing arc length shorter than the arc length of the plate-shaped protrusion 130 and protrudes so that the lateral surface of the plate-shaped protrusion 130 is caught by the anti-separation protrusion 212 during the rotation in the separation direction to prevent the separation.

Further, the anti-separation protrusion 212 is formed so that the lateral surface of the anti-separation protrusion 212, which adjoins the plate-shaped protrusion 130, has a downward inclined surface during the detachment and rotation, such that the plate-shaped protrusion 130 may be easily fastened along the downward inclined surface during the fastening process.

Figure 6:
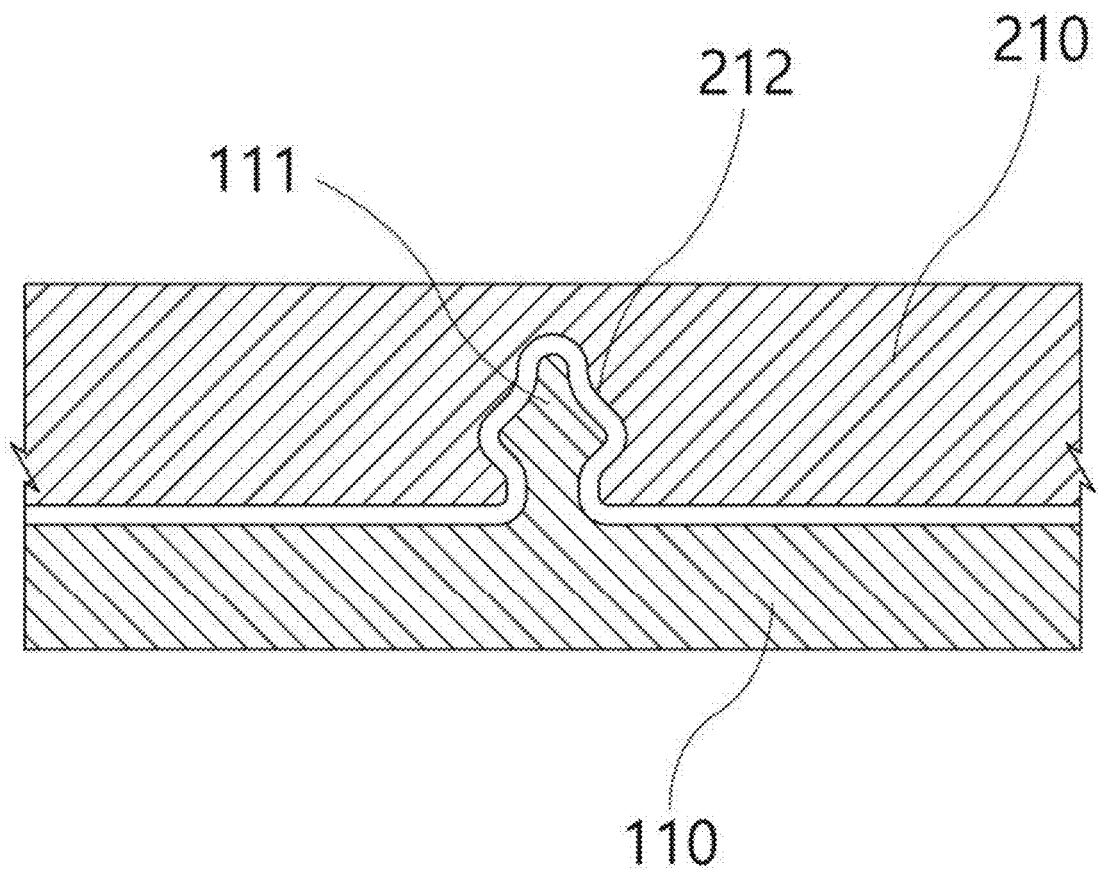
FIG. 6 is a cross-sectional front view illustrating a snap button protrusion and a snap button groove in FIG. 4.

FIG. 6 is a view illustrating another embodiment of the fixing plate 110 and the mounting plate 210.

Referring to the drawings, the fixing plate 110 may have a snap button protrusion 111 formed at a rotation center portion of the other surface thereof. Further, the mounting plate 210 may have a snap button groove 211 rotatably attached and coupled to the rotation center portion by being press-fitted with the snap button protrusion 111.

Because the snap button protrusion 111 and the snap button groove 211 may be attached or detached only by an external force, the fixing plate 110 and the mounting plate 210 are bound during the process of fastening the mounting unit 200, thereby preventing inadvertent separation. In addition, because the snap button protrusion 111 and the snap button groove 211 are positioned at the rotation center portions of the fixing plate 110 and the mounting plate 210 and rotatably coupled, the snap button protrusion 111 and the snap button groove 211 may rotate even in a fastened state. Therefore, the snap button protrusion 111 and the snap button groove 211 may of course ensure fastening forces of the fixing unit 100 and the mounting unit 200 and rotate even in the fastened state, which makes it possible to provide an effect capable of preventing the separation between the fixing unit 100 and the mounting unit 200 even during the rotation in the separation direction.

The accessory unit 300 may be coupled to the mounting plate 210 and configured to correspond to various uses such as accommodation, gripping, or mounting.

Prior to this, the mounting unit 200 may further include a connection portion that allows the accessory unit 300 to be coupled to the mounting plate 210. In this case, various configurations may be applied as the connection portion as long as the connection portion has a shape easily coupled to the accessory unit 300 while corresponding to the configuration of the accessory unit 300. Various accessory units 300 according to the connection portion will be described.

Figure 2:
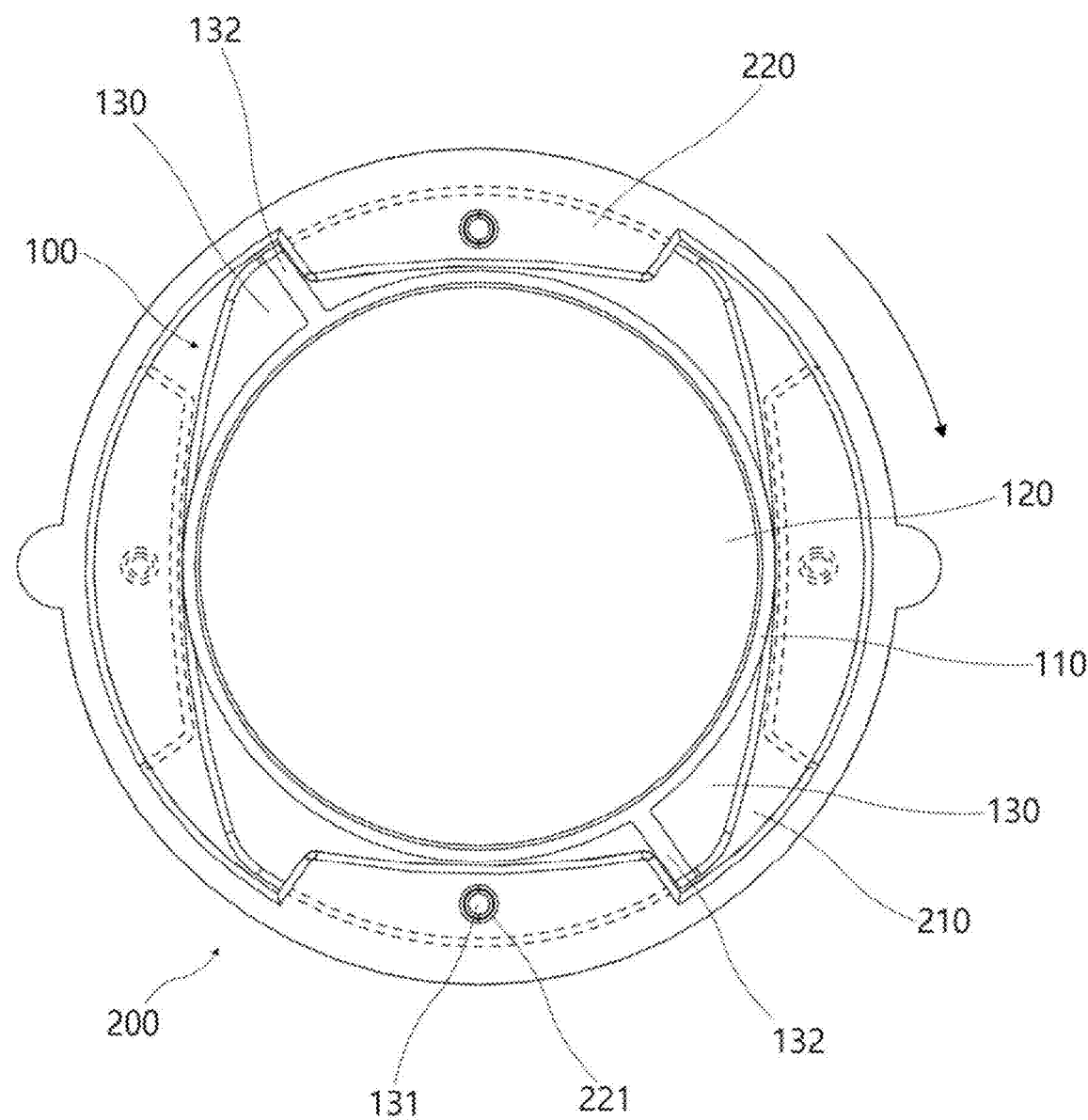
FIG. 2 is a bottom plan view illustrating a structure for attaching or detaching a fixing unit and a mounting unit of the portable terminal accessory module having the detachable means illustrated in FIG. 1.

First, as illustrated in FIG. 1, the accessory unit 300 may be configured to be gripped by the user.

This configuration will be described. First, the connection portion has a circular plate shape coupled to the mounting plate 210. Further, the accessory unit 300 may include a grip portion 322 rotatably coupled to the connection portion, having a ring or annular shape, and configured to be gripped by the user.

As another embodiment, referring to FIG. 7, the accessory unit 300a may be configured as an accommodation means 311 configured to accommodate accommodation objects 20 including a card, a name card, cash, and the like.

In this case, the accommodation means 311 is configured as a pouch opened at one side and configured to be capable of accommodating the accommodation object 20 in an inner accommodation space 313.

Meanwhile, in this case, the connection portion may be formed in a plate shape and configured to define or support one surface of the accommodation space of the accommodation means 311.

Further, the accommodation means 311 may be configured as any one of a pouch, a casing, and a wallet coupled to the connection portion and configured to accommodate the accommodation object 20 in an internal space or a coupling space defined by the connection portion.

While the present invention has been described with reference to the embodiment illustrated in the drawings, the embodiment is described just for illustration, and those skilled in the present technical field will understand that various modifications of the embodiment and any other embodiment equivalent thereto are available. Accordingly, the true technical protection scope of the present invention should be determined by the technical spirit of the appended claims.

INDUSTRIAL APPLICABILITY

The present invention relates to the portable terminal accessory module having the detachable means, and more particularly, to the portable terminal accessory module having the detachable means stably detachably coupled to the rear surface of the portable terminal or the rear surface of the portable terminal protecting casing and configured to allow various portable terminal accessories to be used while being variably attached or detached. According to the present invention, the portable terminal accessory module having the detachable means according to the present invention includes the modularized accessory unit corresponding to various uses of the portable terminal, and the modularized accessory unit is attachable to or detachable from the portable terminal by means of the fixing unit and the mounting unit, such that the alteration of use may be easily performed, thereby improving the convenience. Further, it is not necessary to add a separate accessory component for the alteration of use, which makes it possible to reduce costs and provide an economical effect.

The invention claimed is:

1. A portable terminal accessory module having a detachable means, which makes it easy to attach or detach various accessory units to or from a rear surface of a portable terminal and stably maintains attachment/detachment coupling forces, the portable terminal accessory module comprising:

a fixing unit including a fixing plate having a plate shape and one surface coupled to any one of the portable terminal and the accessory unit, a plate-shaped protrusion protruding from an outer circumferential surface of the fixing plate, and an attachment means configured to generate an attachment force of the fixing plate;

a mounting unit detachably coupled to the fixing plate and including a mounting plate having a plate shape and one surface on which the fixing unit is seated, and a coupling slot protruding from the mounting plate and configured such that the plate-shaped protrusion is detachably fitted with the coupling slot by rotation; and an accessory unit coupled to the mounting plate, wherein the attachment means is an attachment member having one surface and the other surface onto which an adhesive agent is applied, one surface of the attachment member is attached to the fixing plate, and the other surface of the attachment member is attached to the portable terminal, wherein a first tapered portion is formed on one side surface of the plate-shaped protrusion that comes into contact with the mounting unit, and a second tapered portion is formed on an inner surface of the mounting unit which faces the first tapered portion such that a press-fitting force is generated when the plate-shaped protrusion is fastened, and wherein the plate-shaped protrusion has a catching projection protruding from an end of a side of the mounting unit based on a fastening direction, and when the mounting unit rotates, a lateral surface of the coupling slot is caught by the catching projection, such that the catching projection prevents the mounting plate from excessively rotating or restricts the fastening direction of the mounting unit.

2. The portable terminal accessory module of claim 1, wherein the fixing plate has a circular plate shape, the plate-shaped protrusion protrudes in a radial direction from the outer circumferential surface of the fixing plate, the mounting plate has a circular plate shape so that the fixing plate and the plate-shaped protrusion are seated on the mounting plate, and the coupling slot protrudes toward a center from an outer circumferential surface of the mounting plate so that the plate-shaped protrusion is fitted with the coupling slot during a fastening process.

3. The portable terminal accessory module of claim 2, wherein the plate-shaped protrusion is provided in plural, the plurality of plate-shaped protrusions is spaced apart from one another at spacing angles set from a center of the fixing plate, and the coupling slots are spaced apart from one another and correspond in number and position to the plate-shaped protrusions.

4. The portable terminal accessory module of claim 2, wherein the coupling slot has an arc-shaped cut-out portion cut out from an annular slot portion protruding toward a center from the outer circumferential surface of the mounting plate so that the plate-shaped protrusion is seated.

5. The portable terminal accessory module of claim 4, wherein the cut-out portion and the plate-shaped protrusion have the same planar cross-sectional shape and size.

6. The portable terminal accessory module of claim 2, wherein the coupling slot has a fastening groove or a fastening hole, and the plate-shaped protrusion has a fastening protrusion that protrudes and is detachably fitted with the fastening groove or the fastening hole when the coupling slot is fastened.

7. The portable terminal accessory module of claim 1, wherein the fixing unit has a thickness in a range in which wireless charging is enabled.

8. The portable terminal accessory module of claim 1, wherein the mounting unit further comprises a connection portion that allows the accessory unit to be coupled to the mounting plate, and wherein the accessory unit is configured as an accommodation means that has one surface coupled to the connection portion, has opened one side, and has therein an accommodation space that accommodates an accommodation object.

9. The portable terminal accessory module of claim 8, wherein the connection portion has a plate shape and defines or supports one surface of the accommodation space of the accommodation means, and wherein the accommodation means is any one of a pouch, a casing, and a wallet coupled to the connection portion and configured to accommodate the accommodation object in an internal space or a coupling space defined by the connection portion.

10. The portable terminal accessory module of claim 1, wherein the first tapered portion is formed at a first taper angle with respect to a horizontal central axis of the plate-shaped protrusion, the second tapered portion is formed at a second taper angle with respect to a horizontal central axis of an insertion space into which the plate-shaped protrusion is inserted, and the second taper angle is larger than the first taper angle.

* * * * *